(12) United States Patent
So et al.

(10) Patent No.: US 8,780,590 B2
(45) Date of Patent: Jul. 15, 2014

(54) OUTPUT CURRENT ESTIMATION FOR AN ISOLATED FLYBACK CONVERTER WITH VARIABLE SWITCHING FREQUENCY CONTROL AND DUTY CYCLE ADJUSTMENT FOR BOTH PWM AND PFM MODES

(75) Inventors: Wai Kit (Victor) So, Hong Kong (HK); Hing Kit Kwan, Hong Kong (HK); Chik Wai (David) Ng, Hong Kong (HK); Po Wah (Patrick) Chang, Hong Kong (HK)

(73) Assignee: Hong Kong Applied Science & Technology Research Institute Company, Ltd., Hong Kong (HK)

( * ) Notice: Subject to any disclaimer, the term of this patent is extended or adjusted under 35 U.S.C. 154(b) by 274 days.

(21) Appl. No.: 13/462,986

(22) Filed: May 3, 2012

(65) Prior Publication Data

US 2013/0294118 A1  Nov. 7, 2013

(51) Int. Cl.
*H02M 3/335* (2006.01)
(52) U.S. Cl.
USPC ........................................................ 363/21.16
(58) Field of Classification Search
CPC .................. H02M 3/335; H02M 3/33507
USPC ................. 363/21.12, 21.13, 21.16, 21.18
See application file for complete search history.

(56) References Cited

U.S. PATENT DOCUMENTS

| 6,707,283 B1 | 3/2004 | Ball |
| 7,012,819 B2 | 3/2006 | Feldtkeller |
| 7,388,764 B2 | 6/2008 | Huynh et al. |
| 7,525,259 B2 | 4/2009 | Weirich |
| 2009/0290390 A1* | 11/2009 | Piper ........................... 363/21.04 |
| 2010/0321956 A1* | 12/2010 | Yeh ................................... 363/16 |
| 2012/0281438 A1* | 11/2012 | Fang et al. .................. 363/21.12 |

FOREIGN PATENT DOCUMENTS

| CN | 1492568 A | 4/2004 |
| CN | 1700560 A | 5/2005 |
| CN | 1702949 A | 11/2005 |
| CN | 1826720 A | 8/2006 |
| CN | 101944858 A | 1/2011 |

OTHER PUBLICATIONS

On Semiconductor, "NCP1253 Current-Mode PWM Controller for Off-line Power Supplies", Jan. 2012, pp. 1-15.

* cited by examiner

*Primary Examiner* — Harry Behm
*Assistant Examiner* — Matthew Grubb
(74) *Attorney, Agent, or Firm* — Stuart T. Auvinen; g Patent LLC

(57) ABSTRACT

A fly-back power converter has a current-estimating control loop that senses the primary output current in a transformer to control the secondary output. A primary-side control circuit switches primary current through the transformer on and off. A discharge time when a secondary current through an auxiliary winding of the transformer is flowing is generated by sampling a voltage divider on an auxiliary loop for a knee-point. A normalized duty cycle is calculated by multiplying the discharge time by a current that is proportional to the switching frequency and comparing to a sawtooth signal having the switching frequency. The peak of a primary-side voltage is sensed from the primary current loop and converted to a current and multiplied by the normalized duty cycle to generate an estimated current. An error amp compares the estimated current to a reference to adjust the oscillator frequency and peak current to control primary switching.

20 Claims, 10 Drawing Sheets

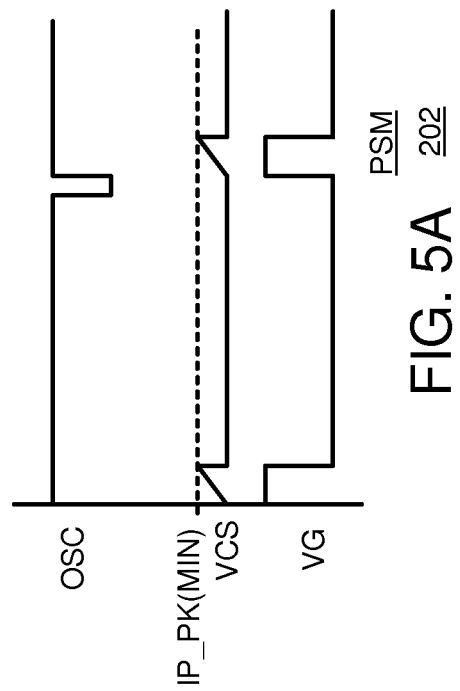
FIG. 5A PSM 202
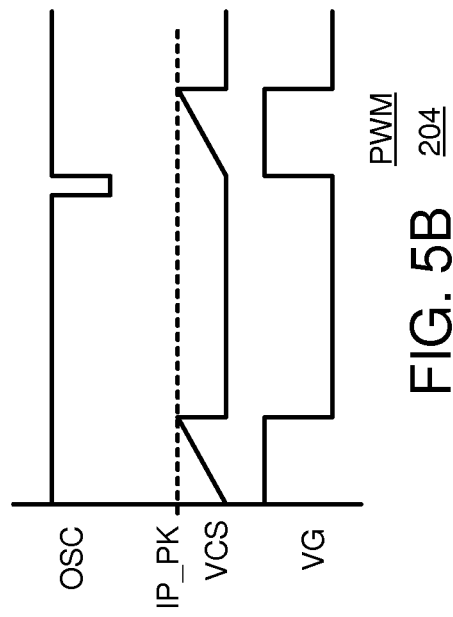
FIG. 5B PWM 204
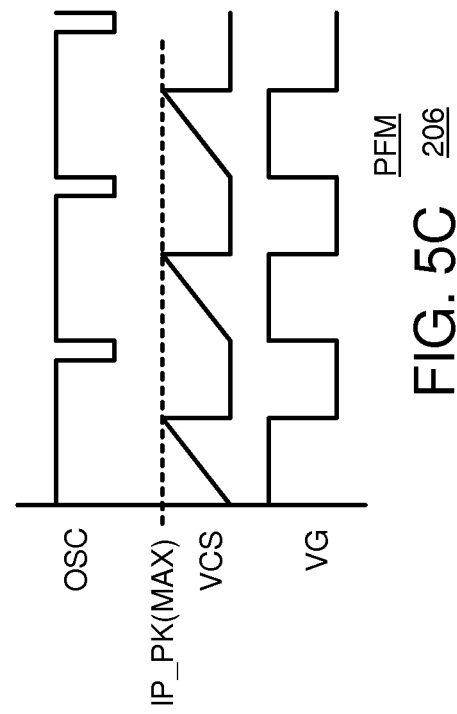
FIG. 5C PFM 206

OUTPUT CURRENT ESTIMATION FOR AN ISOLATED FLYBACK CONVERTER WITH VARIABLE SWITCHING FREQUENCY CONTROL AND DUTY CYCLE ADJUSTMENT FOR BOTH PWM AND PFM MODES

RELATED APPLICATION

This application is related to the co-pending application for "Constant-Current Control Module using Inverter Filter Multiplier for Off-line Current-Mode Primary-Side Sense Isolated Flyback Converter", U.S. Ser. No. 12/718,707, filed Mar. 5, 2010.

FIELD OF THE INVENTION

This invention relates to power converters, and more particularly to fly-back converters with primary side regulation.

BACKGROUND OF THE INVENTION

Power converters are useful in many applications, such as converting Alternating-Current (AC) from a power outlet to Direct Current (DC) for use in electronic devices. In cathode-ray tubes (CRT's), a fly-back inverter was used to block the electron beam when the raster dot was retracing or flying back to the beginning on the next raster line in the display. This class of power converters is still known as a fly-back converter, even though they are used in many non-CRT applications, such as for driving light-emitting diodes (LED's) and chargers.

Control circuitry is needed to produce a constant DC output current. A transformer may be used to isolate the primary side connected to the AC power from the DC output side for enhanced safety. Opto-isolators have been used to isolate the control circuitry, but these opto-isolators are relatively expensive and do not integrate well with integrated circuits (IC's).

Rather than connect the control circuitry to the secondary (DC) side of the transformer, the control circuitry can connect to the primary (AC) side. Heat dissipation, form factors, component counts, and costs can be reduced with primary-side sensing regulators (PSR) and control due to the higher efficiency and elimination of the opto-isolator.

While a variety of fly-back converters are known, many of these only support Pulse-Width-Modulation (PWM) control. Some applications may operate over a wide range of power and would benefit from Pulse-Frequency-Modulation (PWM) and Pulse-Skipping-Modulation (PSM) that both vary the frequency while maintaining a relatively constant pulse width or duty cycle.

What is desired is a fly-back converter with primary-side control that does not need an opto-isolator. A fly-back converter that supports both PWM and PFM control is desirable that produces a constant current drive. Current accuracy is desirable using a circuit that models power over PSM, PWM, and PFM regions of operation. Control by estimation of output current is desirable.

BRIEF DESCRIPTION OF THE DRAWINGS

FIGS. 5A-C are waveforms of switching during PSM, PWM, and PFM modes.

DETAILED DESCRIPTION

The present invention relates to an improvement in power converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
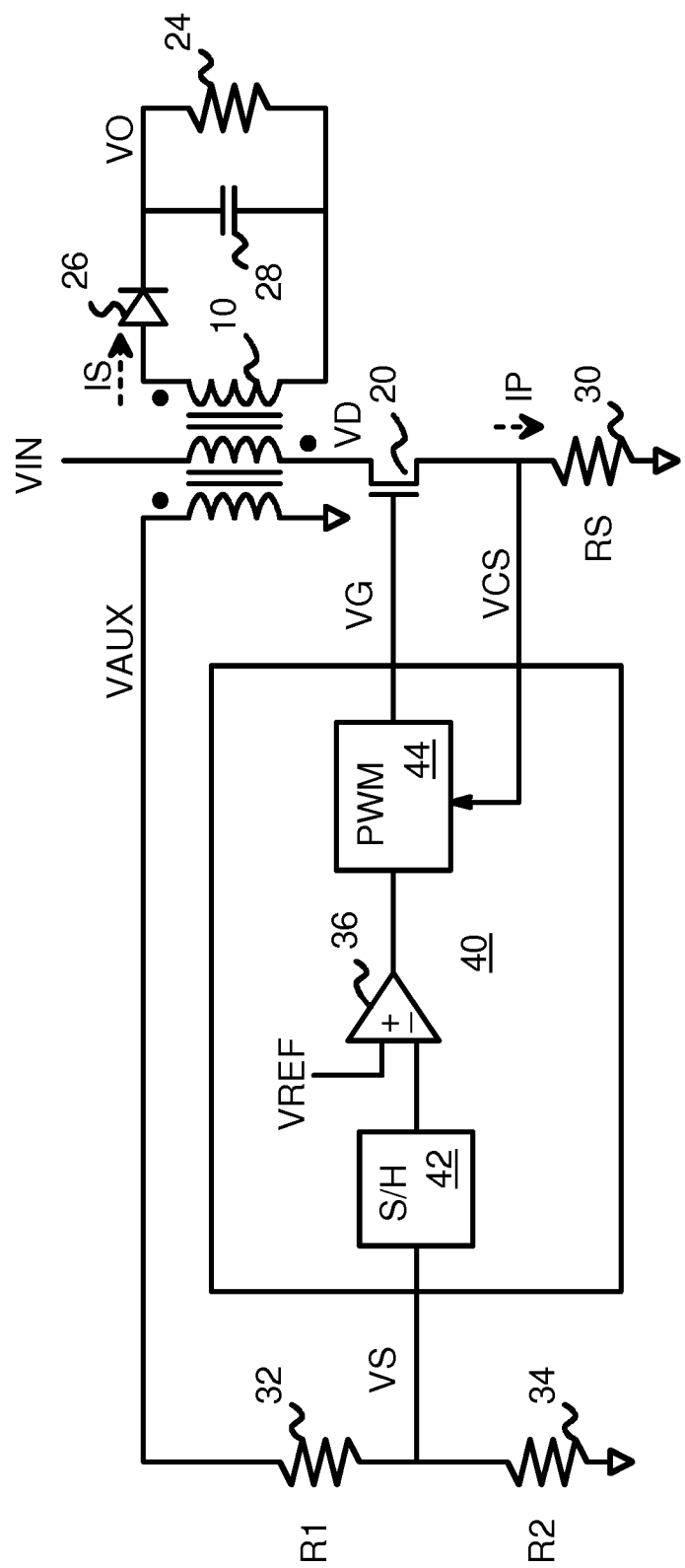
FIG. 1 shows a diagram of a simplified fly-back converter that switches the primary current.

FIG. 1 shows a diagram of a simplified fly-back converter that switches the primary current. An AC supply produces an alternating-current that is applied to a full-wave rectifier bridge of diodes to generate an input voltage VIN. Alternately, VIN may be a DC source that is not generated from AC.

Transformer 10 can have an iron core to enhanced mutual inductance between primary windings that are connected between input voltage VIN and drain voltage VD, and secondary windings connected to secondary diode 26. A third winding in transformer 10 connects to auxiliary voltage VAUX. The direction of the windings in transformer 10, as shown by the dots, is such that an abrupt halt to a downward primary current IP causes a secondary current IS to flow upward due to mutual inductance in transformer 10. Likewise, an abrupt halt in primary current IP causes an auxiliary current to flow from transformer 10 to voltage VAUX and then through sensing resistors 32, 34 to generate sampled voltage VS in the auxiliary loop of transformer 10.

The primary loop of transformer 10 has primary current IP flowing from VIN, through the primary windings of transformer 10 to VD, and then through switch 20 to primary sensing voltage VCS, and finally through primary sensing resistor 30 to ground. The primary current IP is measured as the current through primary sensing resistor 30, which produces a primary sensing voltage VCS that is equal to the I-R drop, or VCS=IP*RS, where RS is the resistance of primary sensing resistor 30.

The secondary loop of transformer 10 has secondary current IS flowing from the secondary windings of transformer 10 through forward-biased secondary diode 26 to output voltage VO. Secondary capacitor 28 stores charge to provide a more constant current through load resistor 24 when secondary current IS is not flowing from transformer 10.

The third loop of transformer 10 has auxiliary current flowing from the third windings of transformer 10 at auxiliary voltage VAUX, through sensing resistors 32, 34 to ground. Sensing resistors 32, 34 form a voltage divider that generates sampled voltage VS.

Switch 20 is an n-channel transistor that has a gate controlled by gate voltage VG. The primary current through transformer 10 is abruptly cut off when gate voltage VG is switched from high to low, causing switch 20 to turn off. The primary current slowly increases when gate voltage VG is switched from low to high, causing switch 20 to turn on. The primary current increases slowly when switch 20 is turned on since the inductance of transformer 10 acts as a resistance to sudden changes in current.

Sample and hold (S/H) latch 42 samples the sampled voltage VS and drives an input of error amp 36, which compares the sampled voltage to a reference voltage VREF. The compare result from error amp 36 is sent to PWM controller 44.

PWM controller 44 in control loop 40 turns switch 20 on and off by controlling gate voltage VG. PWM controller 44 drives VG high to turn on switch 20 every clock cycle. PWM controller 44 drives VG low to turn off switch 20 when VCS is higher than an internal VCS reference when the sampled voltage VS falls below VREF. When the sampled voltage VS falls below VREF, the controller raise the internal VCS reference. When sampled voltage VS rises above VREF, the controller decrease the internal VCS reference.

Error amp 36 could be an op amp or other kind of amplifier. Error amp 36 has a high gain to force VS to match VREF through feedback.

Figure 2:
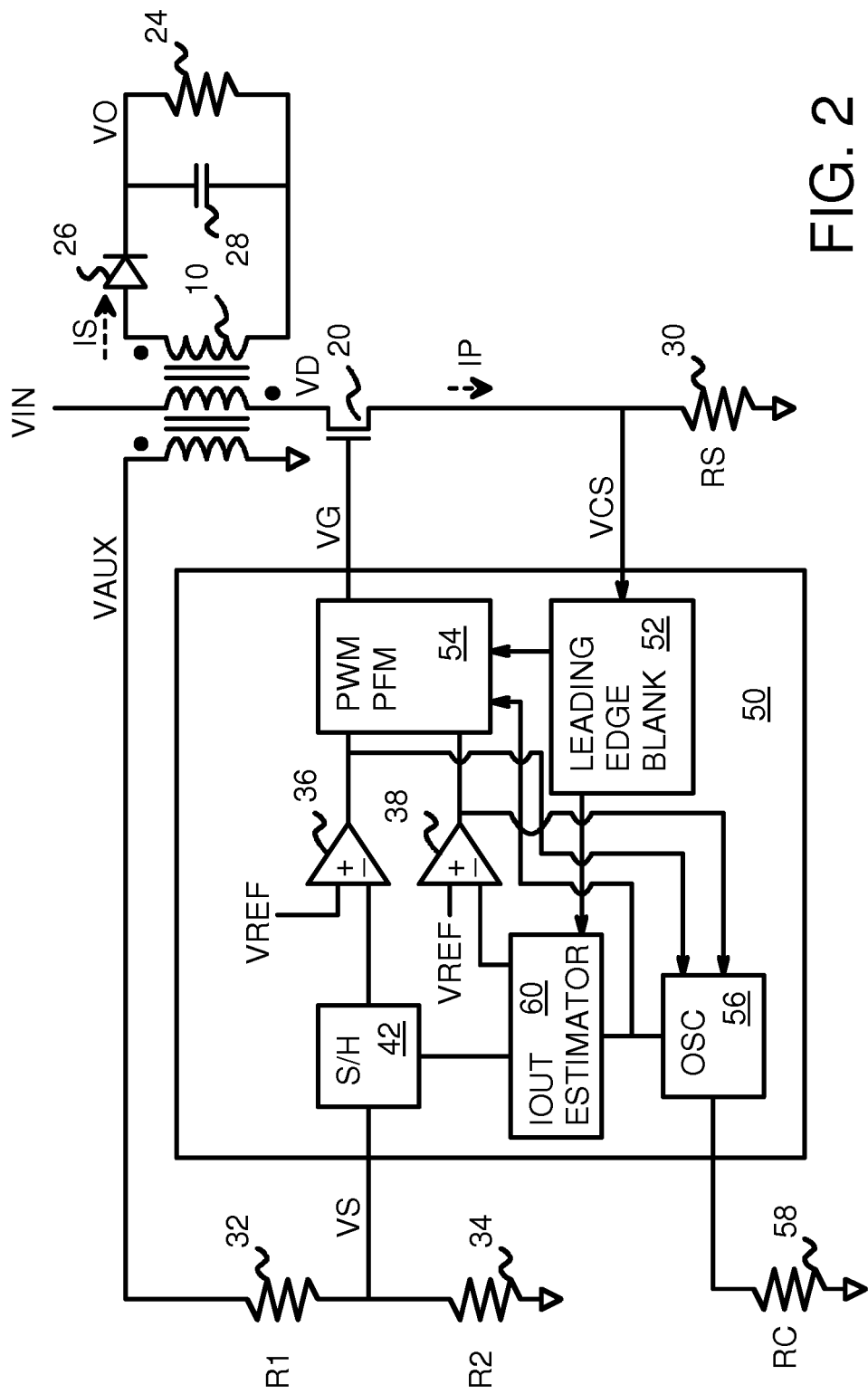
FIG. 2 is a schematic of a flyback converter with output current estimation for both PFM and PWM control.

FIG. 2 is a schematic of a flyback converter with output current estimation for both PFM and PWM control. The auxiliary voltage VAUX from the third winding of transformer 10 passes through sensing resistors 32, 34 to generate sampled voltage VS, which is sampled by Sample and Hold (S/H) latch 42. Error amp 36 compares the sampled voltage to reference voltage VREF to control PWM/PFM controller 54, which drives gate voltage VG to switch 20.

The primary current switched by switch 20 generates voltage VCS when passing through primary sensing resistor 30. Leading edge blanker 52 blocks the leading edge of VCS to remove any glitches, such as due to a diode, and detects a peak current through primary sensing resistor 30. The value of the peak current detected is sent from leading edge blanker 52 to output current estimator 60.

Voltage Controlled Oscillator (VCO) 56 generates a clock frequency according to the output voltage of error amp 36 and the output voltage of error amp 38. The maximum frequency of VCO 56 can be controlled by resistor 58. VCO 56 also generates a small triangular voltage ripple and adds on a peak-current reference that is regulated by the output voltage of error amp 36 and error amp 38. The peak current from leading edge blanker 52 and the current form of the switching frequency are applied to output current estimator 60, along with the discharge time, TD from Sample and Hold (S/H) latch 42. Output current estimator 60 takes these inputs and generates an estimate of the output current IS in the secondary side of transformer 10.

The estimated output current generated by output current estimator 60 is converted to a voltage and compared to reference voltage VREF by error amplifier 38. The compare result is also applied to PWM/PFM controller 54 to further adjust the pulse width and frequency of the switching signal applied to switch 20, gate voltage VG.

Control circuit 50 generates an estimate of the output current and performs both pulse-width and frequency control of the switching signal to switch 20. Control circuit 50 can operate in three modes of operation: Pulse-Skipping-Modulation (PSM), Pulse-Width-Modulation (PWM), and Pulse-Frequency-Modulation (PFM) modes. A wide range of output power may be supported using three modes of operation.

Figure 3:
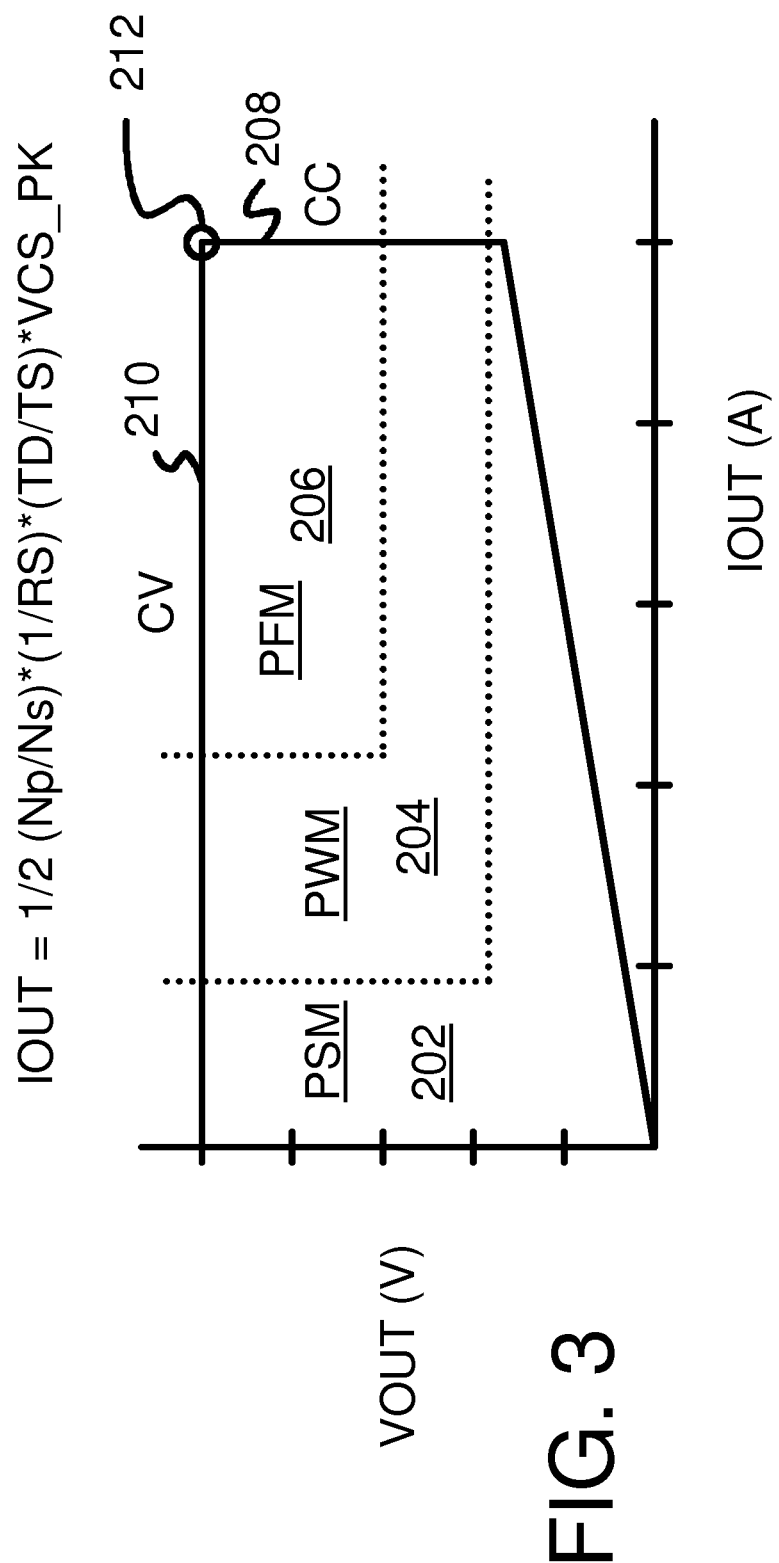
FIG. 3 is a Voltage-Current graph of the three modes of operation of the flyback converter of Fig.

FIG. 3 is a Voltage-Current graph of the three modes of operation of the flyback converter of FIG. 2. During Pulse-Skipping-Modulation (PSM) mode 202, some pulses of the switching signal to switch 20 are deleted, thus reducing the frequency and output power. The output voltage and/or current are very low in PSM mode 202, so very low levels of the output power are achieved.

In Pulse-Width-Modulation (PWM) mode 204, the frequency is held constant, but the pulse width of the switching signal VG to switch 20 is steadily increased. As the pulse width increases, the duty cycle increases and the amount of time per period (cycle) that switch 20 remains on increases. This allows more time for the primary current to increase, producing a higher peak primary current, and for the output capacitor to be charged up, also raising the output voltage. The higher output voltage and/or output current produces a higher output power.

In Pulse-Frequency-Modulation (PFM) mode 206, the pulse width has already reached a maximum duty cycle at the end of PWM mode 204. The pulse width is held constant (in absolute time) and the frequency is increased. The higher frequency increases the primary current delivered, and also increases the charging current to the output load, increasing the output voltage and/or current, and power.

In Constant Current (CC) mode 208, the secondary output current (IS of FIG. 2) is held constant but the output voltage (VO of FIG. 2) decreases. In Constant Voltage (CV) mode 210, the output current IS is increasing while the output voltage VO is held constant. The output current increases until maximum power transfer point 212.

CV mode 210 and CC mode 208 can each operate in three modes: PSM mode 202, PWM mode 204, and PFM mode 206. Having three modes increases efficiency. The converter may also operate in an under-voltage protection mode, shown by the sloped line below CV mode 210.

The maximum power deliverable by the flyback converter occurs at maximum power transfer point 212. At maximum power transfer point 212, the maximum power transferred can be selected by adjusting the value of RS, the resistance of primary sensing resistor 30, and ratio of the number of windings in the primary transformer Np to the number of windings in the secondary transformer Ns.

The average of secondary output current IS, IS_Ave=Iout, during PSM mode 202, PWM mode 204, and PFM mode 206 is:

$$Iout = \tfrac{1}{2}(Np/Ns)*(1/RS)*(TD/TS)*Vcs\_pk$$

where Np and Ns are the number of windings in the primary and secondary of transformer 10, RS is the resistance of primary sensing resistor 30, TS is the period of the switching signal VG applied to switch 20 and TD is the discharge time, when the secondary current IS is flowing, so TD/TS is the duty cycle of the secondary current, and Vcs_pk is the peak of VCS in a period.

The output current depends on the load that is connected to the converter, such as resistor 24 at VO in FIG. 2. For example, a 5V1A converter may have various loads attached, as shown in Table 1 below:

TABLE 1

Power and Loading

| Load (ohm) | Voltage (V) | Current (A) | Power (W) | Mode |
|---|---|---|---|---|
| 50 | 5 | 0.1 | 0.5 | PSM |
| 20 | 5 | 0.25 | 1.25 | PWM |

TABLE 1-continued

Power and Loading

| Load (ohm) | Voltage (V) | Current (A) | Power (W) | Mode |
|---|---|---|---|---|
| 10 | 5 | 0.5 | 2.5 | PFM |
| 5 | 5 | 1 | 5 | PFM, Max Pwr |
| 4 | 4 | 1 | 4 | PFM |
| 1 | 1 | 1 | 1 | PWM |
| 0.5 | 0.5 | 1 | 0.5 | PSM |

The converter controls the output power up to the maximum power point (Max Pwr). After that point, the converter regulates to lower power to keep the output current constant.

Figure 4A:
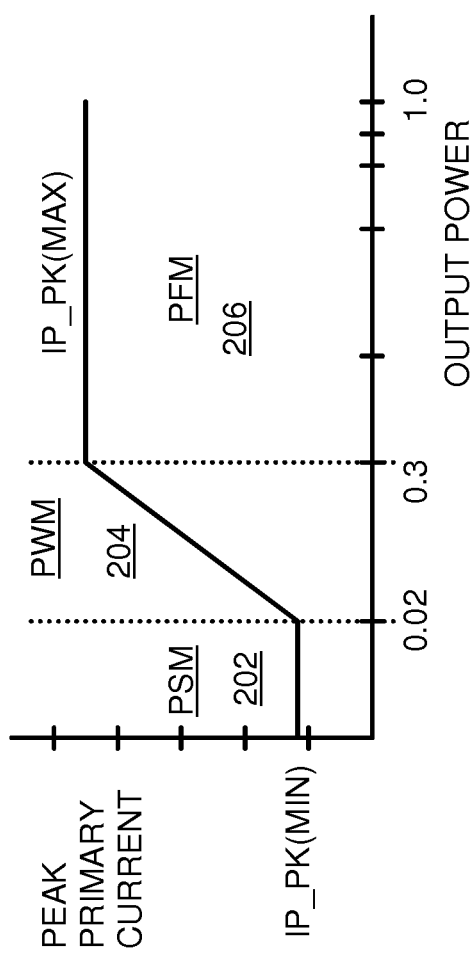
FIGS. 4A-B are graphs of output power during PSM, PWM, and PFM modes.
Figure 4B:
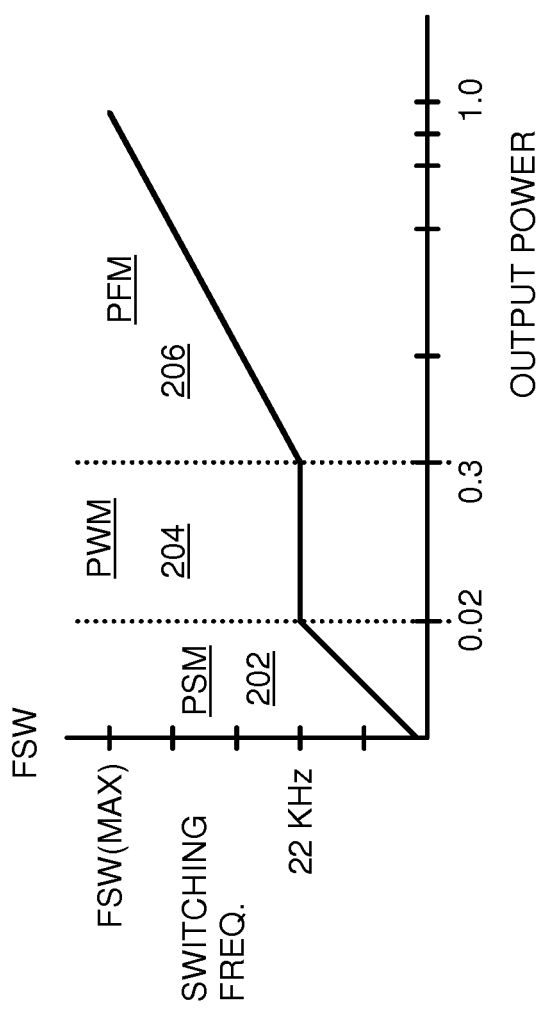

FIGS. 4A-B are graphs of output power during PSM, PWM, and PFM modes. In FIG. 4A, the output power increases through PSM, PWM, and PFM modes, with low output power in PSM mode 202 and high output power in PFM mode 206.

The peak of the primary current IP for each period, IP_PK, is low and constant during PSM mode 202, since the pulse width remains constant. During PSM mode 202, fewer pulses are skipped to increase the output power, but the width of the pulses remains constant. The same peak current is reached for all pulses, since they all have the same duration.

In PWM mode 204, the switching frequency FSW is held constant, but the pulse width and duty cycle increase. The longer pulse width provides more time for the primary current to rise, producing higher peak currents during PWM mode 204. Once the maximum pulse width is reached at the end of PWM mode 204, the primary current is at its maximum, IP_PK(max). The peak primary current remains at this maximum throughout PFM mode 206, where the pulse width is held steady by the switching frequency FSW increases.

In FIG. 4B, the switching frequency FSW of the VG signal applied to the gate of switch 20 is shown. The switching frequency increases during PSM mode 202 as fewer and fewer pulses are skipped. During PWM mode 204, the switching frequency is held constant, such as at 22 KHz, while the pulse width is increased. In PFM mode 206, the switching frequency is raised to increase the output power while the pulse width is held constant.

FIGS. 5A-C are waveforms of switching during PSM, PWM, and PFM modes. In FIG. 5A, the oscillator generates a dithering clock OSC that is pulsed low to trigger a new cycle. PWM controller 44 pulses VG high to turn on switch 20. The primary current through transformer 10 rises while the VG pulse is high, and the higher current through switch 20 and primary sensing resistor 30 increases primary sensing voltage VCS. The maximum of VCS at the end of the VG pulse is determined by the peak primary current IP_PK, which is at a minimum during PSM mode 202. During PSM mode 202, fewer and fewer pulses are skipped to increase power.

Pulses can be skipped by using a clock divider that divides OSC, or by qualifying the trigger generated by a constant OSC, such as by skipping the gate pulse to switch 20 every other OSC pulse, or by a variable divisor.

In FIG. 5B, in PWM mode 204, the frequency of OSC remains constant, but the pulse width is increased as power is increased. The pulse width of the VG pulse is increased during PWM mode 204. The wider VG pulse provides more time for the primary current through transformer 10 to increase. Thus the peak primary current, IP_PK, is larger during PWM mode 204 than during PSM mode 202. The higher primary current also produces a larger primary sensing voltage VCS.

In FIG. 5C, in PFM mode 206, the frequency of the dithering clock OSC is increased to increase the output power. The width of the VG pulses remains constant. Primary sensing voltage VCS rises during each VG pulse to the maximum that corresponds to IP_PK(maximum), which is also the maximum peak current at the end of PWM mode 204.

Figure 6:
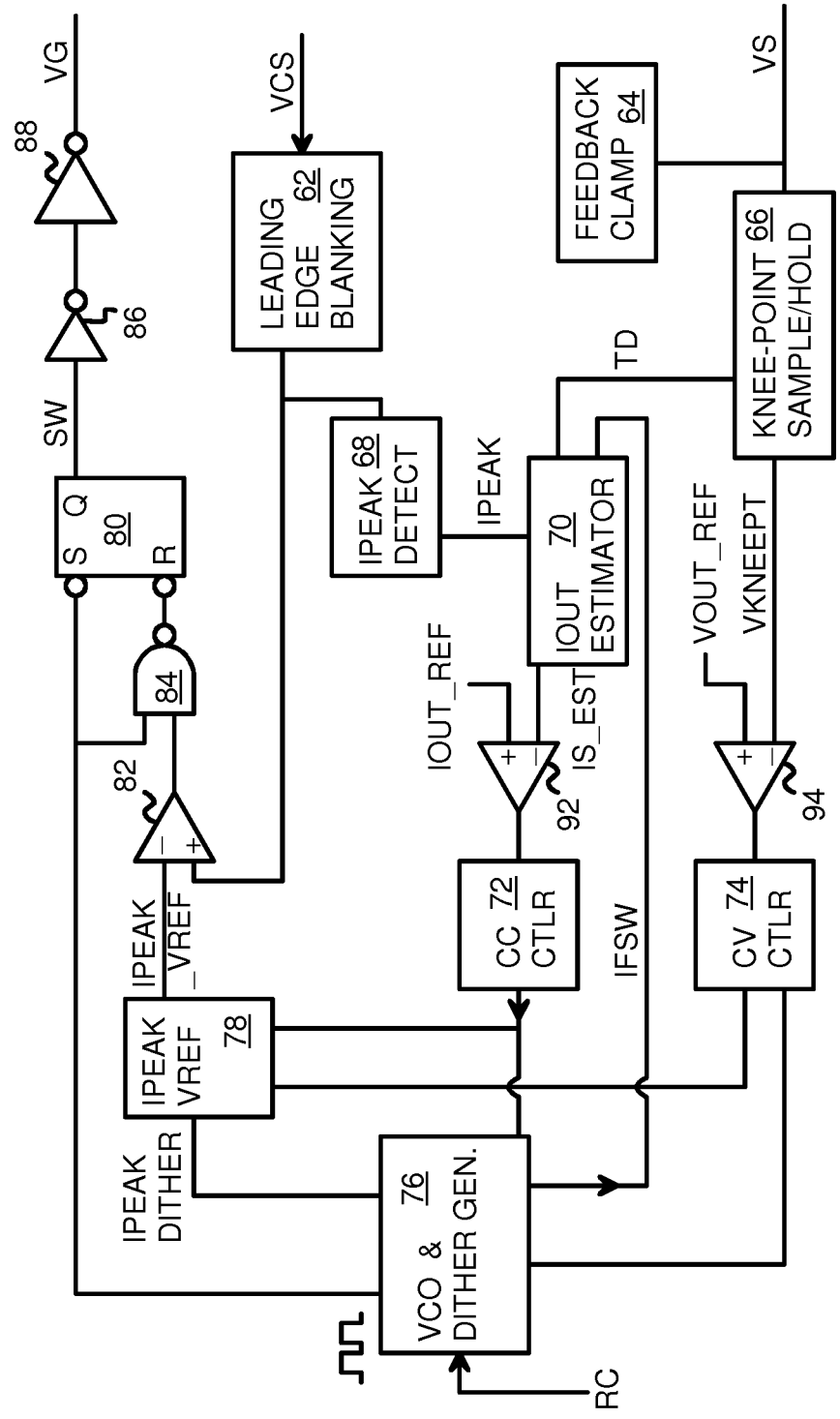
FIG. 6 is a block diagram of the switch control circuit that estimates output current for PSM, PWM, and PFM modes.

FIG. 6 is a block diagram of the switch control circuit that estimates output current for PSM, PWM, and PFM modes. When S-R latch 80 is set, VG goes high, starting the primary ON time TON. When S-R latch 80 is reset, VG goes low, ending the primary ON time TON.

S-R latch 80 is set by the dithering clock OSC from dithering generator 76, which includes a voltage-controlled oscillator (VCO) that has a maximum frequency set by resistance RC. Some clock pulses may be skipped by dithering generator 76 during PSM mode.

The output of S-R latch 80 is buffered by inverter 86 and driver 88 to drive gate voltage VG to the gate of switch 20. VG carries the switching signal that operates at switching frequency FSW.

The S, R inputs to S-R latch 80 are active low. NAND gate 84 ensures that R is high (off) when S is active low. Each low-going pulse of OSC triggers a VG pulse, and the VG pulse is terminated once primary sensing voltage VCS rises above a peak current reference voltage, as determined by comparator 82.

Leading edge blanker 62 blocks the leading edge of VCS, which occurs at the beginning of the VG pulse, but later passes VCS through to an input of comparator 82. Comparator 82 also receives a peak current reference voltage (Ipeak_Vref) generated by Ipeak reference generator 78. Once VCS rises above the reference voltage generated by Ipeak reference generator 78, Comparator 82 toggles its output high, causing a low pulse to be applied to the R input of S-R latch 80, resetting it and ending the VG pulse.

Ipeak reference generator 78 generates a target for the peak current, Ipeak, through primary sensing resistor 30. The target is peak current reference voltage (Ipeak_Vref). The end of the VG pulse is triggered when this target peak current is reached. The target peak current, controlled by peak current reference voltage (Ipeak_Vref), is controlled by constant current controller 72 when operating in constant current mode, or by constant voltage controller 74, when operating in constant voltage mode.

Dithering generator 76 generates the dithering clock OSC and a reset signal RESET that trigger the start of each VG switching pulse. The frequency of OSC ramps up during PSM and PFM modes to increase output current or voltage, but remains constant during PWM mode. The VCO in dithering generator 76 generates a small triangular voltage with a zero mean which is added to the peak current reference voltage (Ipeak_Vref) to generate a dithering clock thru feedback control and sends a signal IFSW indicating the switching frequency to output current estimator.

Figure 7:
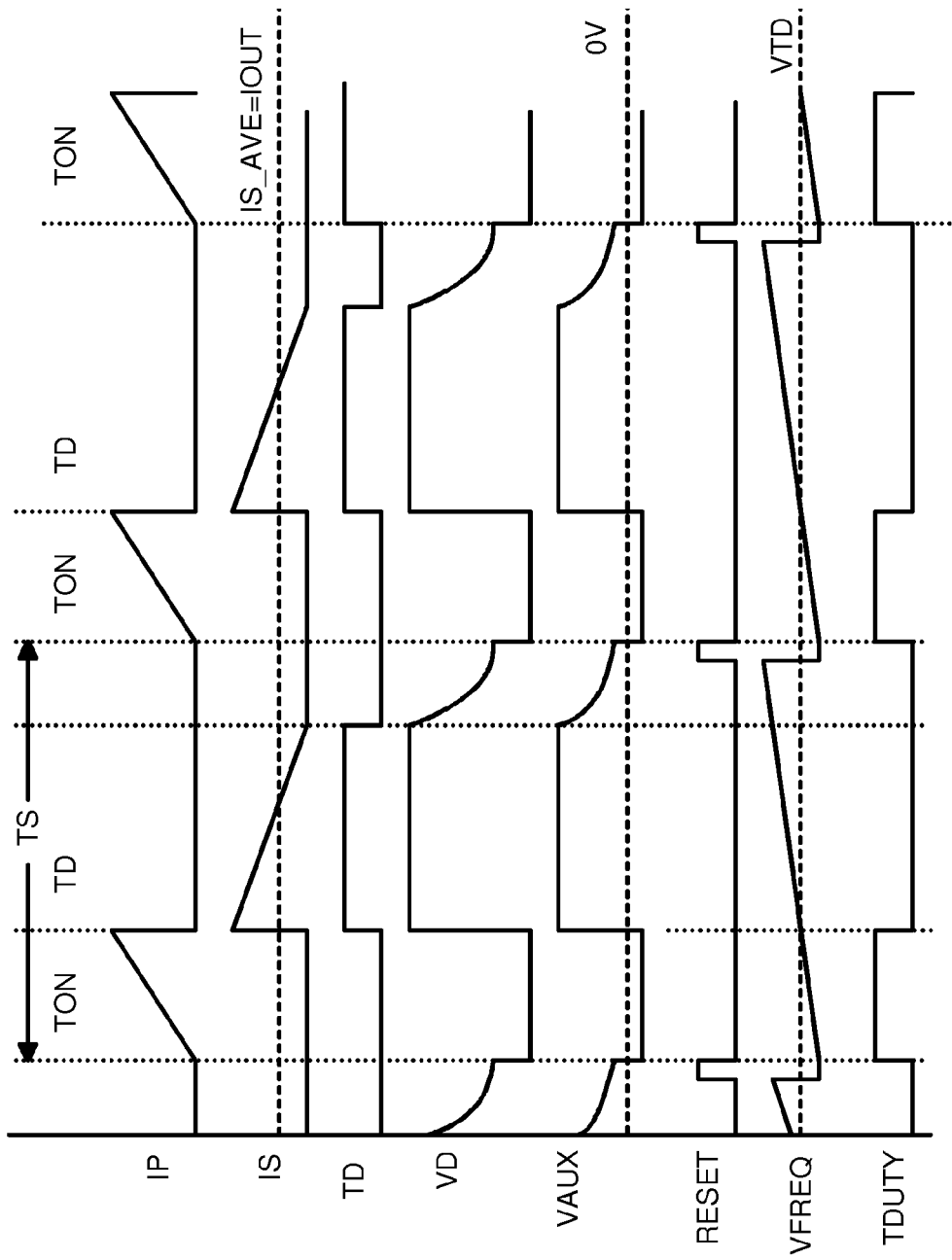
FIG. 7 is a waveform showing operation of the current estimating control circuit while operating in PWM mode.

The VS pin that is divided from the auxiliary voltage VAUX from the third winding may drop below ground when VG is high, so it is clamped by feedback clamp 64. The scaled auxiliary winding voltage VS is then sampled by knee-point sample and hold latch 66. Kneepoint sample and hold latch 66 generates the kneepoint voltage, Vkneepoint, which occurs when the secondary winding current is zero, and VS is at its knee-point. At the moment of zero secondary current, the secondary output voltage VO (FIG. 2) is equal to the secondary winding voltage. VO is obtained by sampling VS, which is divided from VAUX, at the moment when the secondary side current is zero. When the secondary side current is approaching zero, the slope of VS increases rapidly, with the appearance of a knee. In order to sample VO accurately, the knee-point should be sampled accurately. In FIG. 7, the knee point of VAUX is located at the end of discharge time TD, when IS reaches zero, at the third dotted vertical line.

Error amp 94 is the error amp in the CV loop, while error amp 92 is the error amp in the CC loop. When the output current is less than the current at the maximum power point, the controller operates in CV mode. When the output current is larger than the current at maximum power point 212 (FIG. 3), the controller operates in the CC mode.

In both CV mode and CC mode, there are three mode of modulation: PSM, PWM and PFM modes. During CV mode with PWM modulation, error amp 94 and CV controller 74 activate Ipeak reference generator 78 to raise the peak-current reference (Ipeak_Vref) when the knee-point voltage is below VOUT_REF, such that the duty cycle of switch 20 and VG increases. During CV mode with PFM modulation, error amp 94 and CV controller 74 activate dithering generator 76 to raise the clock frequency produced by the VCO in dithering generator 76. During CC mode with PWM modulation, error amp 92 and CC controller 72 activate Ipeak reference generator 78 to raise the peak-current reference (Ipeak_Vref) when the estimated current generated by output current estimator 70 is below IOUT_REF. During CC mode with PFM modulation, error amp 92 and CC controller 72 activate dithering generator 76 to raise the clock frequency from the VCO in dithering generator 76.

CV controller 74 determines when to move from PWM mode to PFM mode according to the output voltage of error amp 94 during CV mode. CC controller 72 determines when to move from PWM mode to PFM mode according to the output voltage of error amp 92 during CC mode.

Output current estimator 70 receives a peak primary current from peak detector 68, which measures a peak voltage on VCS. Output current estimator 70 also receives the switching frequency IFSW from dithering generator 76, and the discharge time signal TD from kneepoint sample and hold latch 66. TD is the discharge time when the secondary current is flowing. Secondary current IS drops from IS_peak to zero during TD. When the secondary current reaches zero, the knee-point is reached and the TD signal falls or ends.

Output current estimator 70 uses the measured peak current, frequency, and discharge time TD to estimate the output current for the instant clock cycle. The estimated output current IS_EST from output current estimator 70 is compared to a reference output current IOUT_REF by error amp 92, and when the estimate rises above the reference, constant current controller 72 activates Ipeak reference generator 78 to lower the peak-current reference (Ipeak_Vref) during PWM mode, or activates dithering generator 76 to lower the OSC clock frequency in PFM mode. IS_EST is a voltage that represents the estimated average secondary current, or IS_AVE, while IOUT_REF is a voltage that represents the target for the average secondary current.

The average output current Tout during PSM mode 202, PWM mode 204, and PFM mode 206 is estimated by output current estimator 70 using the equation:

$$IS\_EST = Iout = \frac{1}{2}(Np/Ns)^*(1/RS)^*(TD/TS)^*Vcs\_pk$$

where Np and Ns are the number of windings in the primary and secondary of transformer 10, RS is the resistance of primary sensing resistor 30, TS is the period of the switching signal VG applied to switch 20 and TD is the discharge pulse width when the secondary current is flowing, so TD/TS is the secondary duty cycle, and Vcs_pk is the peak of VCS in a period.

FIG. 7 is a waveform showing operation of the current estimating control circuit while operating in PWM mode. The dithering clock OSC (not shown) has a period TS and generates signal RESET. A high-going pulse of RESET is generated for every rising edge of OSC. During time TON, VG is pulsed high and switch 20 is turned on, but VG and switch 20 are off for the remainder of period TS.

The primary current IP rises during TON as the inductance of transformer 10 slowly allows a greater current flow over time. At the end of TON and the beginning of discharge time TD, switch 20 is turned off by VG falling. The mutual inductance of transformer 10 causes the sudden cut off of primary current IP to create a sharp rise in secondary current IS. Secondary current IS then decays over discharge time TD.

The output current Tout estimated by output current estimator 70 is the average secondary current IS_AVE. It is the average over TS.

The sudden disconnect of switch 20 also causes drain voltage VD to quickly rise as transformer 10 continues to push current through the primary windings, and this current builds up charge on the drain of switch 20, voltage VD. Drain voltage VD remains high during TD, but decays once the secondary current IS stops flowing. As secondary current IS goes to zero, secondary side diode 26 is reversed biased and VD starts to ring. This is the knee-point, at the third dotted line when IS reaches zero. The knee shape of VD and VAUX are seen at this time point.

Likewise, the auxiliary voltage VAUX also jumps above zero when the primary current IP stops, as mutual inductance also causes the auxiliary current to flow through the third windings of transformer 10.

As time passes, the secondary and auxiliary currents are reduced. Once these induced currents reach zero, the knee point is reached on VAUX, and VS is sampled through the resistor divider.

Signal VFREQ is reset by RESET from the OSC signal, and is charged up over most of the TS period. When VFREQ rises above voltage VTD, the duty signal pulse TDUTY ends. TDUTY begins at the end of RESET, and corresponds to the duty of the TD over TS.

OSC generates a set signal that causes SR latch 80 to drive SW and VG high, ending TS and beginning a new TON period. The primary current IP again begins to flow, and IP increases over time. S-R latch 80 is set when OSC has a high pulse, and it reset when VCS is higher than the peak-current reference (Ipeak_Vref), as detected by comparator 82.

Figure 8:
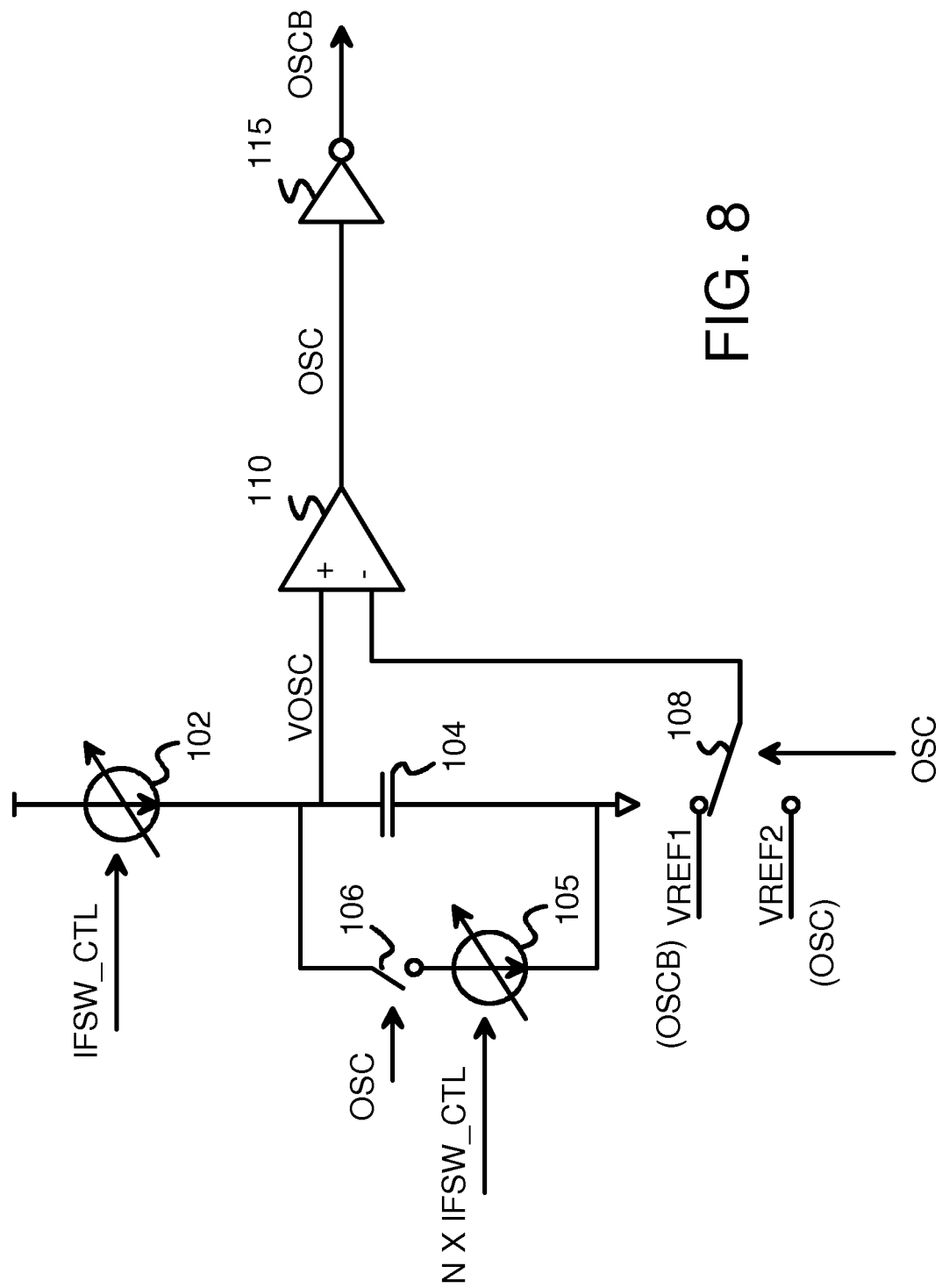
FIG. 8 is a diagram of an oscillator that generates a dithering clock.

FIG. 8 is a diagram of an oscillator that generates a dithering clock. Current source 102 supplies a current to charge capacitor 104. Once the voltage on capacitor 104 rises above reference voltage VREF1 selected by switch 108, comparator 110 toggles, driving OSC high. Inverter 115 then drives OSCB low. Switch 108 toggles, causing VREF2 rather than VREF1 to be applied to comparator 110.

Switch 106 closes when OSC is high, causing current sink 105 to discharge capacitor 104. Once the voltage VOSC on capacitor 104 falls below VREF2, comparator 110 toggles OSC low, ending the cycle.

Current source 102 generates a current that is a function of the switching frequency FSW, since bias voltage IFSW_CTL is applied to current source 102. IFSW_CTL determines the frequency of OSC.

Current sink 105 sinks a current that is N times the current sourced by current source 102. For example, N could be 2, producing a 2:1 current sink to current source, and a 2:1 low to high pulse ratio, or a duty cycle of 33%. The frequency generated is a function of N, VREF1, VREF2, the capacitance of capacitor 104, and the current generated by current source 102, which is a function of bias voltage IFSW_CTL.

Figure 9:
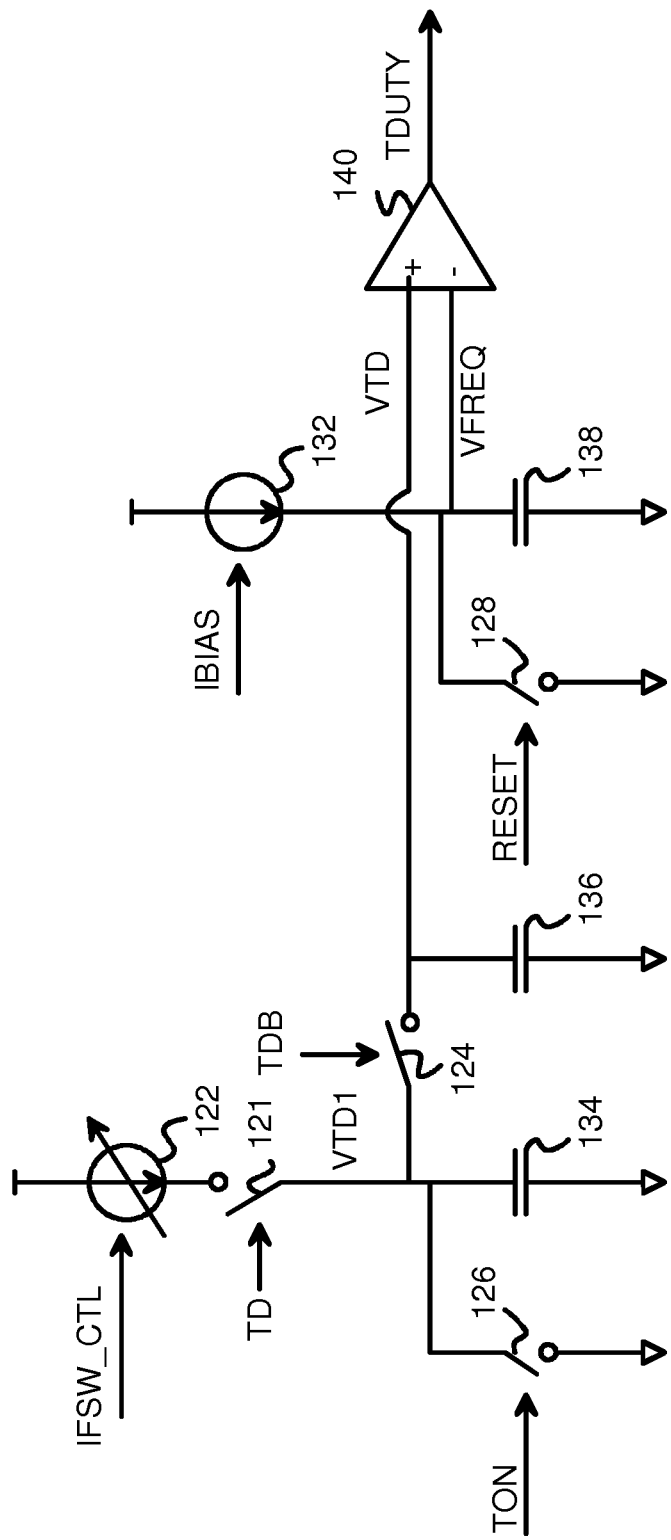
FIG. 9 is a schematic of a duty cycle calculation circuit.

FIG. 9 is a schematic of a duty cycle calculation circuit. The reset signal RESET, shown in FIG. 7, pulses high to begin a new cycle. RESET is generated by dithering generator 76 from an oscillator signal such as OSC shown in FIG. 8. RESET pulses high in response to a rising edge of OSC.

RESET closes switch 128 to discharge capacitor 138 when RESET is high. Once RESET ends, current source 132 charges capacitor 138, raising VFREQ. Once VFREQ rises above VTD, comparator 140 toggles and drives TDUTY low. These waveforms are shown at the bottom of FIG. 7. VFREQ is a sawtooth waveform.

TON is high when the primary current is flowing. TON high closes switch 126 to discharge capacitor 134 before the secondary current begins to flow. When TON ends and TD begins, the secondary current is at its maximum. The TON and TD signals used in this circuit can have their timing adjusted to be non-overlapping.

When TD is high, current source 122 charges capacitor 134 through switch 121. When TD is low, switch 121 opens and switch 124 closes. Charge is shared between capacitors 134, 136, causing VTD to equalize with voltage VTD1. Capacitor 136 is much smaller than capacitor 134, so the maximum voltage on VTD1 on capacitor 134 is resampled to hold on smaller capacitor 136 as VTD.

Current source 122 produces a current that is a function of bias voltage IFSW_CTL. Current source 132 produces a current which is a function of a bias voltage that is (VREF1−VREF2)/R2, where R2 is a resistor with a current flowing between VREF1 and VREF2.

TD goes high when VS goes high and TD goes low when the knee point is detected on VS. TD is normalized to the switching period by the circuit of FIG. 9. Also, voltage VTD1 is converted to a time-based signal, TDUTY, whose width represents the duty of discharge time TD with respect to switching period TS. VTD is compared to the sawtooth waveform of VFREQ, which has a slope proportional to IBIAS, which is programmable by adjusting resistance R2, VREF1, and VREF2.

Figure 10:
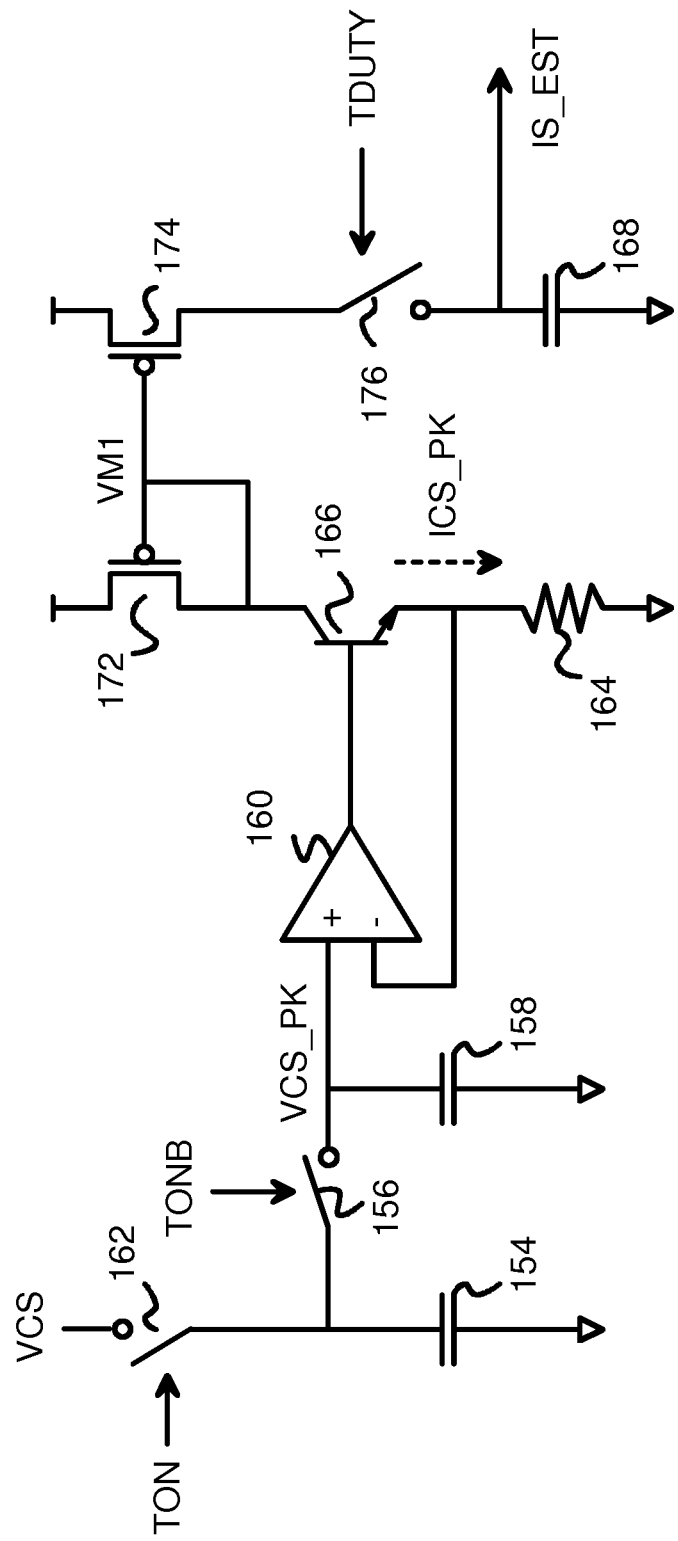
FIG. 10 is a schematic of a voltage-to-current converter and a multiplier.

Output current estimator 70 (FIG. 6) includes three blocks: a duty cycle calculation circuit, as shown in FIG. 9, a VCS to ICS voltage-to-current converter, shown in FIG. 10, and a time and ICS multiplier also shown in FIG. 10. A duty cycle signal that represents the normalized duty of discharge time TD with respect to switching period TS generated by the circuit of FIG. 9 is multiplied by primary sensing current ICS, which is an approximation of the primary current IP. ICS is converted from the primary sensing voltage VCS. The pulse width of the duty cycle signal represents the normalized duty of discharge time TD.

FIG. 10 is a schematic of a voltage-to-current converter and a multiplier. Primary sensing voltage VCS is converted to a current ICS_PK by this circuit. VCS charges capacitor 154 through switch 162 during the TON portion of the cycle when the primary current is flowing. When the TON signal ends, the peak of the VCS voltage on capacitor 154 is sampled and held. When the primary current stops, TON goes low and switch 162 opens and switch 156 closes, causing charge sharing between capacitors 154, 158. Capacitor 158 produces voltage VCS_PK that is the peak voltage of VCS. Capacitor 158 can be much smaller than capacitor 154, such as 10 times smaller, to resample the voltage on capacitor 154. The TONB signal is used to resample and hold the peak of VCS.

Error amp 160 compares VCS_PK to a feedback voltage generated by current ICS_PK passing through resistor 164. The base voltage of NPN transistor 166 is adjusted by the output of error amp 160 until the voltage generated by ICS_PK passing through resistor 164 matches VCS_PK. The collector current through NPN transistor 166 is sourced by p-channel transistor 172. The bias voltage VM1 of the gate and drain of p-channel transistor 172 is also applied to the gate of mirror p-channel transistor 174, which mirrors current ICS_PK to the multiplier circuit. Thus voltage VCS is converted to current ICS_PK.

In the multiplier circuit, mirror p-channel transistor 174 mirrors the converted current ICS_PK through switch 176 to charge capacitor 168 when TDUTY is high. TDUTY is generated by the circuit of FIG. 9, and the time of the TDUTY pulse represents a normalized duty of discharge time TD with respect to TS. Thus the normalized duty cycle is being multiplied by the current ICS_PK converted from the primary sensing voltage VCS. The voltage on capacitor 168 is output as the estimated secondary current, IS_EST. The voltage on capacitor 168 corresponds to the estimated secondary current at the moment that switch 176 is opened. It is a voltage that is applied to error amp 92.

Equations

Assuming a triangle wave, such as shown in FIG. 7 for IS, the average secondary current IS_AVE is half of the peak secondary current IS_PK multiplied by the discharge time TD, when the primary current IP is off and the secondary current IS is on, or:

$IS\_ave = \frac{1}{2} * TD/TS * IS\_peak$

The primary and secondary currents are related by the number of windings or turns in the primary Np and the number of windings in the secondary Ns:

$IS\_peak = Np/Ns * IP\_peak$

Combining these equations, $IS\_ave = \frac{1}{2} * TD/TS * Np/Ns * IP\_peak$

For the duty-cycle calculation circuit in FIG. 9, where C1 is the capacitance of capacitor 134, COSC is the capacitance of capacitor 104, C2 is the capacitance of capacitor 138, and Ibias from current source 132 is (VREF1−VREF2)/R2, and N is the ratio of current source 102 to current source 105, then:

$Q = CV$ $IFSW * TD = C1 * VTD$ $VTD = IFSW * TD/C1 = (COSC/C1) * (VREF1 - VREF2)/N * TD/TS$ $IFSW\_CTL = (COSC * (VREF1 - VREF2))/(N * TS)$ $Ibias * Tduty = C2 * VTD$ $Tduty = C2 * VTD/Ibias$ $= C2 * (COSC/C1) * (VREF1 - VREF2)/N * TD/TS * R2/(VREF1 - VREF2)$ $Tduty = (1/N) * (C2 * COSC * R2)/C1 * TD/TS$ In FIG. 10, where C3 is the capacitance of capacitor 154, C4 is the capacitance of capacitor 158, C5 is the capacitance of capacitor 168, and R1 is the resistance of resistor 164:

$Ics\_pk = Vcs\_pk/R1$ $Q = CV$ $Ics\_pk * Tduty = C5 * V(IS\_EST)$ $V(IS\_EST) = Ics\_pk * Tduty/C5$ $$= Vcs\_pk * Tduty/(R1*C5)$$

$$=(C2*COSC*R2)/(N*C1*C5*R1)*Vcs\_pk*TD/TS$$

So the estimated output current IS_EST in voltage form is proportional to TD/TS and Vcs_pk. Vcs_pk and TD are the input of output current estimator 70.

K=(C2*COSC*R2)/(N*C1*C5*R1) is the proportional constant, in which resistors and capacitors appear in both nominator and denominator. Since any mismatch of resistors and capacitors on the same wafer is very small, the constant K is process invariant.

Alternate Embodiments

Several other embodiments are contemplated by the inventors. For example, the control method or output current estimator could be applied to other types of quasi-resonant or valley switching. The frequency may be modulated further to reduce electro-magnetic interference (EMI), such as by slightly shifting the leading edges of the switch pulse (VG), or by randomizing the pulses skipped during PSM mode 202.

While the frequency has been described as constant during PWM mode, and the pulse width has been described as constant during PSM and PFM modes, there may be some dithering or ripple that slightly varies the constant frequency or pulse width. For example, the frequency may be increasable in discrete quanta rather than continuously. When the frequency is being raised in PFM mode, the constant peak current and pulse width may be varied slightly between steps in the frequency to provide a more continuous increase in power. Also, dithering of the pulse width and frequency may be performed for EMI reduction. Thus the constant frequency and pulse width may vary by a small amount, such as 1% or 5%. Also, the pulse width in absolute terms varies with frequency, but the pulse width that is normalized to the clock period is constant with respect to frequency, except for dithering.

To implement this dithering effect, dithering generator 76 may generate a small triangular voltage with zero mean that is added to Ipeak_Vref from Ipeak reference generator 78 to create an Ipeak_Vref with triangular ripples. The purpose of this is to create a dithering of Ipeak_Vref, which in turn creates a dithered clock from the VCO in dithering generator 76 through the feedback loop to compensating for the ripples in Ipeak_Vref.

From the Power equation:

$$Pout=\tfrac{1}{2}*Lp*Ipk^2*Fsw*N$$

Where Pout is the output power, Lp is the primary winding inductance, Ipk is the primary peak current, Fsw is the switching frequency, and N is the Efficiency.

Assume the Efficiency is unchanged, when there is a slight increase in Ipk, then Fsw has to decrease to maintain the same output power. The dither ripple in Ipk results in a dithering of the switching frequency.

Currents may be converted to voltages for actual use in a circuit. For example, the estimated average output current IS_EST generated by output current estimator 70 can be a voltage that represents the estimated current. Error amp 92 can compare the voltage form of IS_EST to a voltage that represents the target estimated current, IOUT_REF. In one embodiment, IOUT_REF can be 2.5 volts, while VOUT_REF can be 2.0 volts. IOUT_REF determines the maximum output current, while VOUT_REF determines the maximum output voltage VO. These may be fixed into the hardware, but the user can still adjust the maximum current or maximum voltage.

For programming the maximum output current, the user can change the resistance value RS of primary sensing resistor 30, or change the winding ratio of the secondary, Ns, to the primary, Np. To change the maximum output voltage, the user could adjust the winding ratio of the secondary, Ns, to the auxiliary, Naux windings, or change the resistor divider at the auxiliary winding. The estimated output current is:

$$IS\_EST=K(VCS\_peak \times TD/TS), \text{ where } K \text{ is fixed inside the chip.}$$

The real output current is:

$$Iout=\tfrac{1}{2}(Np/(Ns \times RS)) \times (Vcs\_peak*TD/TS)$$

By adjusting RS or Np/Ns, the user can adjust the real output current. For programming the maximum output voltage, the user can simply change the Ns to Naux ratio or the resistor divider at the auxiliary winding.

CC controller 72 and CV controller 74 may operate simultaneously or separately. CC controller 72 and CV controller 74 may have their outputs compared to determine which one dominates and controls dithering generator 76 and Ipeak reference generator 78. For example, when the output from error amp 94 dominates the output from error amp 92, then the converter operates in CV mode. Some applications may determine which mode is dominant and disable the other mode. For example, consider a 5V1A AC/DC converter application. If the customer use the converter to drive a single LED (3.5V, 1 A), then the converter operates in CC mode exclusively. If the customer uses the converter with a load that requires less than 1 A, then the converter operates in CV mode and regulates the output VO to 5V. However, in some applications, both CC and CV mode are used, such as a phone charger, where the battery initially needs 1 A for charging, but later requires a maximum voltage of 5V once the battery is fully charged.

While 22 KHz has been shown as a transition point between PSM and PWM modes, other values for transition points could be substituted. Since 22 KHz is above the audible range, it provides a good transition point. The transition points could be varied or programmed. CV controller 74 could be merged with CC controller 72 and could be implemented as programmable logic, firmware, a signal processor, or hardware gates in a hardware controller. Either analog or digital domains could be used, or a combination thereof. Controllers 72 and 74 may be implemented using an analog approach, such as a gain (gm) cell to compare and output the corresponding Ipeak_Vref and frequency.

While an analog implementation of output current estimator 70 has been shown in FIGS. 9, 10, an implementation in the digital domain is also contemplated. For example, a digital-signal processor (DSP) could be programmed for these functions and others.

Some components may be present in a real circuit that are not shown here, such as circuitry to block glitches and prevent false triggering. Some circuitry may be eliminated or bypassed. For example, voltage VCS could be applied directly to comparator 82 and to output current estimator 70. Clamping of VS could be performed by a diode or in some other manner, or could be deleted.

P-channel rather than n-channel transistors may be used for some technologies or processes, and inversions, buffers, capacitors, resistors, gates, or other components may be added to some nodes for various purposes and to tweak the converter.

Timings may be adjusted by adding delay lines or by controlling delays in leading-edge blocking units. Pulse generators could also be added. The outputs of SR latches may be swapped to add an inversion, and an inverter substituted for a buffer. The inverting and non-inverting inputs to comparators may be swapped and the polarity of the output reversed. Comparators may be substituted by error amps, operational amplifiers, or op amps, various kinds of comparators, or differential buffers, or vice-versa.

Separate VCC and grounds may be used for some components. Alternately, transformer 10 may have only 2 windings rather than three, and VCC generated in some other manner, or another transformer may be used. The oscillator may be a ring oscillator or an R-C delay oscillator or a clock generator or a buffer of an external clock, or may generate a periodic signal in some other manner.

Rather than use a S-R latch, a toggle flip-flop could be used with a clock that samples the set and reset inputs. Other kinds of storage elements could be used, such as flip-flops, latches, or bistable nodes. Logic gating can be used to emulate a S-R latch using other bistables, such as a D-type flip-flop with logic gates that combine the set and reset inputs to generate the D input or reset input, and these are equivalents to SR latches. The polarity of set and reset can be swapped. Active low rather than active high signals may be substituted.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A current controller comprising:
an oscillator that generates an oscillator signal having a frequency that is related to a frequency signal;
a peak-current reference generator that generates a feedback signal indicating a target voltage, the target voltage being a target of a peak of a primary sensing voltage, wherein the primary sensing voltage is generated by a primary current from a primary winding of a transformer;
wherein the primary current is switched at the frequency of the oscillator signal;
a target comparator that compares the primary sensing voltage to the target voltage and causes the primary current to switch off when the primary sensing voltage reaches the target voltage;
an output current estimator that generates an estimate signal, the estimate signal being an estimate of an average secondary current from a secondary winding of the transformer;
a knee-point sampler that samples an auxiliary voltage generated by an auxiliary current from a third winding of the transformer to generate a knee-point voltage when the auxiliary current stops flowing, the knee-point sampler also generating a discharge time signal, the discharge time signal being active when the auxiliary current is flowing and being inactive when the auxiliary current is not flowing;
a Constant-Current (CC) error amp that compares the estimate signal from the output current estimator to a CC reference to generate a CC control signal; and
a CC controller, activated by the CC control signal, for adjusting the target voltage generated by the peak-current reference generator during the Pulse-Width-Modulation (PWM) mode, and for adjusting the frequency of the oscillator during the Pulse-Frequency-Modulation (PFM) mode;
wherein the output current estimator generates the estimate signal as a function of the discharge time signal, the frequency signal, and the primary sensing voltage,
whereby the average secondary current is estimated from the discharge time signal, the frequency signal, and the primary sensing voltage.

2. The current controller of claim 1 wherein the output current estimator further comprises:
a duty calculator, receiving the discharge time signal, a switch signal that indicates when the primary current is flowing, and the frequency signal, for generating a duty signal that indicates a duty cycle of a secondary current that is normalized to the frequency of the oscillator;
a voltage converter that samples a peak of the primary sensing voltage and generates a peak current that is the peak of the primary sensing voltage converted to a current;
a multiplier that multiplies the peak current by the duty signal to generate the estimate signal,
wherein the estimate signal is a function of the duty cycle of the secondary current multiplied by the peak of the primary sensing voltage.

3. The current controller of claim 2 wherein the duty calculator comprises:
a first current source that generates a frequency-indicating current that is proportional to the frequency signal;
a first switch that is closed by the discharge time signal to allow the frequency-indicating current to flow to a first node;
a sampling capacitor on the first node that is charged by the frequency-indicating current when the first switch is closed;
a first discharge switch that discharges the sampling capacitor before the first switch closes;

a second switch that closes when the discharge time signal is not active, the second switch connecting the first node to a second node;

a re-sampling capacitor on the second node;

a second current source that generates a second source current to a third node;

a sawtooth capacitor on the third node that is charged by the second source current;

a second discharge switch that discharges the sawtooth capacitor before a start of a cycle in response to a reset generated by the oscillator and having the frequency of the oscillator signal; and a comparator that compares the second node to the third node to generate the duty signal.

4. The current controller of claim 3 wherein the voltage converter comprises:

an input switch that connects the primary sensing voltage to a fourth node when the primary current is flowing;

a first converting capacitor on the fourth node that is charged by the primary sensing voltage;

a converting switch that connects the fourth node to a fifth node when the primary current is not flowing;

a second converting capacitor on the fifth node;

a converting error amp receiving the fifth node as an input, and also having a feedback node as an input, and driving a base node;

a transistor that uses the base node to control the peak current flowing between a sixth node and the feedback node;

a converter resistor connected between the sixth node and a ground;

a first mirror transistor having a gate and a drain connected to the sixth node;

wherein a peak of the primary sensing voltage is sampled and converted to the peak current.

5. The current controller of claim 4 wherein the multiplier comprises:

a second mirror transistor having a gate connected to the sixth node, for mirroring the peak current through the first mirror transistor to a seventh node;

a multiplier switch that closes in response to the duty signal to connect the seventh node to an estimate node;

an estimating capacitor connected to the estimate node, for generating the estimate signal on the estimate node;

wherein a mirrored peak current is multiplied by the duty signal to generate the estimate signal.

6. The current controller of claim 2 further comprising:

a Constant-Voltage (CV) error amp that compares the knee-point voltage from the knee-point sampler to a CV reference to generate a CV control signal;

a CV controller, activated by the CV control signal, for adjusting the target voltage generated by the peak-current reference generator during a Pulse-Width-Modulation (PWM) mode, and for adjusting the frequency of the oscillator during a Pulse-Frequency-Modulation (PFM) mode.

7. The current controller of claim 6 further comprising:

a dithering generator, activated at low output power levels, for skipping clock pulses of a base clock to generate the oscillator signal during a Pulse-Skipping-Modulation (PSM) mode that is activated for lower output power levels than for the Pulse-Width-Modulation (PWM) mode.

8. The current controller of claim 6 further comprising:

a leading-edge blanker, coupled to a primary sensing resistor that receives the primary current, the leading-edge blanker for filtering out glitches occurring when the primary current begins to flow to generate the primary sensing voltage, whereby the primary sensing voltage is filtered.

9. The current controller of claim 6 further comprising:

a feedback clamp, coupled to the knee-point sampler, for clamping the auxiliary voltage to a ground, wherein voltage excursions below ground of the auxiliary voltage are clamped to ground.

10. A regulated power converter comprising:

a transformer having a primary winding that receives an input voltage and outputs a drain voltage on a drain node, the transformer also having a secondary winding that outputs a secondary current that is induced by mutual induction from changes in a primary current through the primary winding;

a switch that receives the primary current from the transformer at the drain node, and is controlled by a gate voltage to switch the primary current to a primary-sensing node, wherein the switch is a metal-oxide-semiconductor field-effect transistor (MOSFET);

a primary sensing resistor coupled to the primary-sensing node and generating a primary-sensing voltage on the primary-sensing node when the switch connects the primary current to the primary sensing resistor;

a bistable latch that generates a switch signal that controls the gate voltage to the switch;

an oscillator that generates a set signal to set the bistable latch to activate the switch signal and drive the gate voltage to an enabling voltage that causes the switch to conduct the primary current from the transformer to the primary sensing resistor;

a reset comparator that receives the primary-sensing voltage and receives a feedback voltage, and generates a reset signal to the bistable latch when the primary-sensing voltage crosses the feedback voltage;

wherein the reset signal resets the bistable latch to deactivate the switch signal and drive the gate voltage to a disabling voltage that causes the switch to isolate the transformer from the primary sensing resistor;

an output current estimator that generates an estimate signal, the estimate signal being an estimate of the secondary current averaged over a cycle, the output current estimator generating the estimate signal as a function of a frequency signal from the oscillator that indicates a frequency of the set signal, and the primary-sensing voltage;

a first error amp that receives the estimate signal from the output current estimator and receives a first reference voltage, the first error amp comparing the estimate signal to the first reference voltage to generate a first control signal; and a first feedback controller, receiving the first control signal, for adjusting the feedback voltage and for adjusting a frequency of the oscillator and the set signal in response to the first control signal;

whereby the primary current is switched to control the secondary current.

11. The regulated power converter of claim 10 further comprising:

a third winding of the transformer that outputs an auxiliary current on an auxiliary node, the auxiliary current being induced by mutual induction from changes in the primary current through the primary winding;

wherein the auxiliary current generates an auxiliary voltage;

a knee-point sampler that samples the auxiliary voltage to generate a knee-point voltage when the auxiliary current stops flowing, the knee-point sampler also generating a discharge time signal, the discharge time signal being active when the auxiliary current is flowing and being inactive when the auxiliary current is not flowing;

wherein the output current estimator also receives the discharge time signal from the knee-point sampler, wherein the output current estimator further generates the estimate signal as a function of the discharge time signal, whereby the discharge time signal is generated from the auxiliary current and is factored into the estimate signal.

12. The regulated power converter of claim 11 further comprising:

a second error amp that receives the knee-point voltage from the knee-point sampler and receives a second reference voltage, the second error amp comparing the knee-point voltage to the second reference voltage to generate a second control signal;

a second feedback controller, receiving the second control signal, for adjusting the feedback voltage and for adjusting the frequency of the oscillator and the set signal in response to the second control signal, wherein the second feedback controller is active during a constant voltage mode that regulates the secondary current to produce a constant output voltage across an output load that the secondary current passes through.

13. The regulated power converter of claim 12 wherein the first feedback controller is active during a constant current mode that regulates the secondary current to a constant average value.

14. The regulated power converter of claim 11 wherein the output current estimator further comprises:

a duty-cycle calculation circuit, receiving the discharge time signal and a frequency signal from the oscillator that indicates a frequency of the set signal, for generating a duty-cycle signal that is normalized to the frequency of the set signal;

a voltage-to-current converter that converts a peak of the primary-sensing voltage to a sensed peak current;

a multiplier that multiplies the sensed peak current with the duty-cycle signal to generate an estimated current;

an output capacitor that is charged by the estimated current to generate the estimate signal.

15. The regulated power converter of claim 11 wherein the estimate signal generated by the output current estimator is related to an average of the secondary current, IS_ave, which is a function of a peak of the primary-sensing voltage, Vcs_pk, a resistance value RS of the primary sensing resistor, a number of turns in the primary winding Np, a number of turns in the secondary winding Ns of the transformer, and a duty cycle TD/TS, by an equation:

$$IS\_ave = \tfrac{1}{2} * (Np/Ns) * (1/RS) * (TD/TS) * Vcs\_pk,$$

wherein TS is a period of time for the set signal and TD is a time that the discharge time signal is active.

16. The regulated power converter of claim 11 wherein the first feedback controller operates in a Pulse-Width-Modulation (PWM) mode wherein the feedback voltage is increased while the frequency of the set signal is maintained constant within 5%, and a Pulse-Frequency-Modulation (PFM) mode wherein the frequency of the set signal is increased while the feedback voltage is maintained constant within 5%.

17. A multi-mode control circuit for a transformer comprising:

a clock generator that generates a reset signal having a switching frequency that is proportional to a frequency-control signal;

a duty-cycle calculation circuit that generates a duty-cycle signal that is normalized to the switching frequency;

a voltage-to-current converter that converts a peak of a primary sensing voltage to a sensed peak current;

a multiplier that multiplies the sensed peak current with the duty-cycle signal to generate an estimated current;

an output capacitor that is charged by the estimated current to generate an estimated voltage;

wherein the estimated voltage is an estimate of a cycle-average of a secondary current from the transformer;

wherein the primary sensing voltage is generated by a primary current from the transformer passing through a switch and a sensing resistor;

a feedback comparator that compares the primary sensing voltage to a feedback voltage to generate an ending signal;

wherein the switch is closed by an oscillator signal having the switching frequency and opened by the ending signal; and a mode controller that is activated by the estimated current exceeding a reference value, the mode controller changing the feedback voltage to adjust a pulse width while maintaining the frequency-control signal to within 5% during a Pulse-Width-Modulation (PWM) mode, the mode controller changing the frequency-control signal and maintaining the feedback voltage to within 5% during a Pulse-Frequency-Modulation (PFM) mode, whereby the switching frequency or the feedback voltage are changed in response to the estimated current exceeding the reference value to control the secondary current from the transformer.

18. The multi-mode control circuit of claim 17 further comprising:

knee-point generating means, receiving an auxiliary voltage generated by a third current from a third winding of the transformer, for sampling the auxiliary voltage at a knee-point when the third current falls to zero;

knee-point compare means for comparing the auxiliary voltage sampled by the knee-point generating means to a knee-point reference;

constant-voltage mode controller means, activated when auxiliary voltage exceeds the knee-point reference, for changing the feedback voltage to adjust the pulse width while maintaining the frequency-control signal to within 5% during a Pulse-Width-Modulation (PWM) mode, the mode controller changing the frequency-control signal and maintaining the feedback voltage to within 5% during a Pulse-Frequency-Modulation (PFM) mode, whereby the switching frequency or the feedback voltage are changed in response to the auxiliary voltage exceeding the knee-point reference to control the secondary current from the transformer.

19. The multi-mode control circuit of claim 18 wherein the knee-point generating means further comprises:

discharge time generating means for generating a discharge timing signal when the third current is flowing;

wherein the duty-cycle calculation circuit receives the discharge timing signal, the frequency-control signal, and the primary sensing voltage;

wherein the duty-cycle calculation circuit generates the duty-cycle signal as a function of the discharge timing signal, the frequency-control signal, and a peak of the primary sensing voltage.

20. The multi-mode control circuit of claim 18 further comprising:
a dithering generator that skips clock pulses generated by an oscillator to generate the reset signal when the switching frequency is lower than in the Pulse-Width-Modulation (PWM) mode.

* * * * *